United States Patent
Okitsu et al.

(10) Patent No.: US 8,482,178 B2
(45) Date of Patent: Jul. 9, 2013

(54) ROTOR STRUCTURE OF PERMANENT MAGNET TYPE ROTARY MACHINE

(75) Inventors: Takashi Okitsu, Tokyo (JP); Daiki Matsuhashi, Tokyo (JP); Yukimasa Hisamitsu, Tokyo (JP); Toru Kakebayashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 182 days.

(21) Appl. No.: 13/001,717

(22) PCT Filed: Jun. 24, 2009

(86) PCT No.: PCT/JP2009/061461
§ 371 (c)(1),
(2), (4) Date: Mar. 9, 2011

(87) PCT Pub. No.: WO2010/001776
PCT Pub. Date: Jan. 7, 2010

(65) Prior Publication Data
US 2011/0187219 A1 Aug. 4, 2011

(30) Foreign Application Priority Data
Jun. 30, 2008 (JP) .................................. 2008-170150

(51) Int. Cl.
*H02K 21/12* (2006.01)
*H02K 5/00* (2006.01)
(52) U.S. Cl.
USPC ............ 310/156.27; 310/156.22; 310/156.28; 310/400
(58) Field of Classification Search
USPC ........... 310/156.22, 156.27, 156.28, 400–418
IPC ...................................................... H02K 21/12
See application file for complete search history.

(56) References Cited

U.S. PATENT DOCUMENTS 4,433,261 A * 2/1984 Nashiki et al. ........... 310/156.28
4,674,178 A * 6/1987 Patel ............................... 29/598
(Continued)

FOREIGN PATENT DOCUMENTS
JP 03-159533 7/1991
JP 9019093 1/1997
(Continued)

OTHER PUBLICATIONS

Wikipedia, Coefficient of Thermal Expansion , Nov. 2, 2012, http://en.wikipedia.org/wiki/Thermal_expansion.*

(Continued)

*Primary Examiner* — Tran Nguyen
*Assistant Examiner* — Thomas Truong
(74) *Attorney, Agent, or Firm* — Foley & Lardner LLP (57) ABSTRACT

In a rotor structure of a permanent magnet type rotary machine comprising a cylindrical permanent magnet 3 fixed on an outer peripheral surface of a rotor shaft 2, wherein torque acting on the permanent magnet 3 is transmitted to the rotor shaft 2, the rotor structure further comprises two annular side plates 4 and a holding ring 5. Each side plate has an axial hole 4*a* into which the rotor shaft 2 is fitted so as to rotate with the side plates integrally and the side plates 4 are attached on the both end surface of the permanent magnet 3, respectively so as to confront with each other. A circular U-shaped groove 4*c* coaxially with the axial hole 4*a* is provided at a end surface 4*b* for facing with the permanent magnet 3 of each side plate 4. The holding ring 5 is formed cylindrically and covers circumferential sections of the permanent magnet 3 and the side plates 4 and fasten the permanent magnet 3 and the side plates 4 so as to move them integrally.

2 Claims, 5 Drawing Sheets

U.S. PATENT DOCUMENTS

| | | | |
|---|---|---|---|
| 5,363,004 A * | 11/1994 | Futami et al. | 310/156.53 |
| 6,141,856 A * | 11/2000 | Johnson et al. | 29/598 |
| 7,986,068 B2 * | 7/2011 | Suzuki et al. | 310/156.22 |
| 2008/0111435 A1 * | 5/2008 | Maeda | 310/156.28 |

FOREIGN PATENT DOCUMENTS

| | | |
|---|---|---|
| JP | 2001510008 | 7/2001 |
| JP | 2005-312250 | 11/2005 |
| JP | 2002-354724 | 12/2006 |
| WO | WO 97/43814 | 11/1997 |

OTHER PUBLICATIONS

Characteristics of NdFeB Magnets, Nov. 2, 2012, http://www.ndfeb-info.com/characteristics.aspx.*

International Search report mailed Sep. 15, 2009 in PCT/JP2009/061461.

* cited by examiner

ROTOR STRUCTURE OF PERMANENT MAGNET TYPE ROTARY MACHINE

FIELD OF THE INVENTION

The invention relates to a rotor structure of a permanent magnet type rotary machine for rotating with super high speed, and particularly to a rotor structure of a high speed permanent magnet type rotary machine wherein a permanent magnet formed cylindrically is fixed to the circumferential section of a rotor shaft so as to transmit a torque acting on the permanent magnet to the rotor shaft.

BACKGROUND OF THE INVENTION

In a conventional art, as a rotor structure of a permanent magnetic type rotary machine such as a permanent magnetic type super high speed synchronous motor and permanent magnetic type synchronous motor, it has been well known various rotor structures. For example, a permanent magnet formed cylindrically is fitted to a non-magnetic high reinforcement material (hereinafter, it is referred as "reinforce ring") by a press-in method, a shrinkage fitting method or a cooling fitting method and a permanent magnet formed cylindrically is wound by a non-magnetic metal wire (see Patent Documents 1 and 2.

In a rotor structure with a ring magnet as described above, an interference is acting on the reinforce ring as described above so as to prevent a permanent magnet from being damaged caused by tensile stress acting on an inner diameter of the permanent, magnet while the rotor structure is rotated at high speed, wherein a level of occurred tensile stress is higher than an acceptable tensile stress level of the permanent magnet. Further, concerning with rotational torque acting on a permanent magnet, the interference is provided so as not to separate the permanent magnet from a rotor shaft while the rotor structure is rotated at high speed. Alternatively, the rotor shaft and the permanent magnet are bonded so as to transmit the rotational torque to the rotor shaft. In order to reduce eddy current loss, high strength fiber such as carbon fiber and/or a non-magnetic metal wire are utilized as a reinforce ring.

On the other hand, there is another rotor structure wherein a column-shaped permanent magnet is attached to a reinforce ring by the press-in method, the shrinkage fitting method or the cooling fitting method (see Patent Document 3).

In the case of the rotor structure with the column-shaped permanent magnet, an interference is provided so as not to apply tensile stress of which a strength is not higher than a level of an acceptable tensile stress of the permanent magnet on the permanent magnet in the case that the rotor structure is rotated at high speed in order to prevent the permanent magnet from being broken. The reinforce ring and the rotor shaft are attached at the both ends of the permanent magnet by the press-in method, a cooling fitting method or a welding method. Rotational torque acting on the permanent magnet is transmitted to the rotor shaft through the interference. The interference affects the reinforce ring and the permanent magnet are not separated and the rotor shaft and the permanent magnet are not separated even if centrifugal force is occurred by rotating the rotor structure at high speed. Upon comparing a collar-shaped permanent magnet and a permanent magnet formed cylindrically in the condition that the both magnets have the same diameter and the same length, the column-shaped permanent magnet is not baneful influenced by centrifugal force and magnetomotive force produced by the column-shaped permanent magnet is stronger than that produced by the permanent magnet formed cylindrically.

PRIOR ART DOCUMENTS

Patent Document

Patent Document 1: Japanese Patent Laid-Open Publication No. 03-159533
Patent Document 2: Japanese Patent Laid-Open Publication No. 2005-312250
Patent Document 2: Japanese Patent Laid-Open Publication No. 2002-354724

SUMMARY OF THE INVENTION

Subject to be solved by the Invention

However, in the case of the rotor structures disclosed in the above Patent Documents 1 and 2, a size of interference has to become large in order not to separate a rotor shaft and a permanent magnet even if a certain centrifugal force is occurred and a temperature of the rotor structure is varied. It means that an actual temperature for press-in or shrinkage fitting has to be increased to an unusual high level. In the other words, such an unusual high temperature is not suitable for a mass production. A demerit of an interference of which a size has to become large is similarly affected to a case for employing a cooling fit method. Such a demerit might be baneful influenced to production efficiency for manufacturing a rotor structure.

Under the rotor structure wherein rotational torque of the permanent magnet is transmitted to the rotor shaft by bonding the permanent magnet with the rotor shaft, an adhesive degree of adhesive agent might be weaken at a high temperature (equal or more than 100° C.). Once the permanent magnet is detached from the rotor shaft due to a deterioration of the adhesive agent, the permanent magnet cannot bond with the rotor shaft again. Thus, at the high temperature, it is afraid that the permanent magnet is detached from the rotor shaft and then the rotational torque cannot be transmitted to the rotor shaft.

In addition, in the case that a reinforce ring is made of high strength fiber, the high strength fiber has a low thermal expansion coefficient so that a shrinkage fitting method cannot utilize for the high strength fiber. The press-in method or the cooling fitting method is applicable so as to attach the high strength fiber at a permanent magnet. However, a thermal expansion coefficient of the permanent magnet is about a half of that of iron. It is difficult that an interference is enough large to avoid for occurring tensile stress acting on a permanent magnet less than an acceptable tensile stress of the permanent magnet. It is difficult not to detach the permanent magnet from the rotor shaft regardless centrifugal force and high rotational speed.

Under the rotor structure as described in the Patent document 3, if a size of an interference is enough large so as to occur tensile stress less than an acceptable tensile stress of the permanent magnet, the size of the interference has to be very large. It means that a temperature for a press-in method or a shrinkage fitting method has to be set too high so as to manufacture a large number of rotor structures for actual industrial use. An improvement of a production efficiency of the rotor structure would be restricted. Such a hard situation would be also applicable to the case for employing a cooling fit method.

Further, in the case that the permanent magnet is a column shape, the rotor shaft is divided into a plurality of sections and the permanent magnet is sandwiched by the plurality of sections. As a method for fixing the rotor shaft at the both ends of the permanent magnet, there is a press-in method, a shrinkage fitting method or a cooling fitting method with a reinforce ring. In addition, there is another method for welding a rotor shaft with the reinforce ring. However, in those methods, it is necessary to pay attention to a distortion and a rigidness of the rotor shaft. Therefore, a manufacturing operation becomes complicated.

In the case that the rotor shaft is attached to the permanent magnet with a reinforce ring by the press-in method, the shrinkage fitting method or the cooling fitting method, a large interference is necessary not to detach the reinforce ring from the rotor shaft and not to detach the reinforce ring from the permanent magnet due to an occurrence of centrifugal force and a thermal condition. Since the rotational torque acting on the permanent magnet is transmitted to a reinforce ring and then the rotational torque is transmitted to the rotor shaft. In order to make the interference having a sufficient large size, a temperature for the press-in method or the shrinkage-fitting method is too high to manufacture a rotor structure for actual industrial use. Such a difficultly is also applicable to the method for cool fitting. An improvement of a manufacture efficiency of the rotor structure is restricted.

The applicant of the present patent application filed Japanese patent application No. 2007-240451. In the patent application, the applicant indicates a rotor structure wherein a permanent magnet formed cylindrically is arranged at an circumferential section of a rotor shaft, annular side plates made of metal is fitted on the both end surface of the permanent magnet, respectively and a cylindrical reinforce ring made of metal fastens the permanent magnet and the annular side plates integrally.

However, in such a rotor structure, while a rotary machine has to be operated with a high speed at a temperature of which a range is wide, it is occurred a size difference between an outer diameter of a permanent magnet and an outer diameter of a side plate caused by a difference between a thermal expansion coefficient of the permanent magnet and that of the side plates and a size tolerances of the permanent magnet and the side plates. If such a size tolerance between the outer diameter of the permanent magnet and the outer diameter of the side plate becomes large, an outer diameter of one of the permanent magnet and the side plate that is larger than an outer diameter of another would become equivalent of an inner diameter of a reinforcement ring so that fastening force applied by the reinforce ring with respect to another of which an outer diameter is smaller than that of one of the permanent magnet and the side plate.

Figure 7:
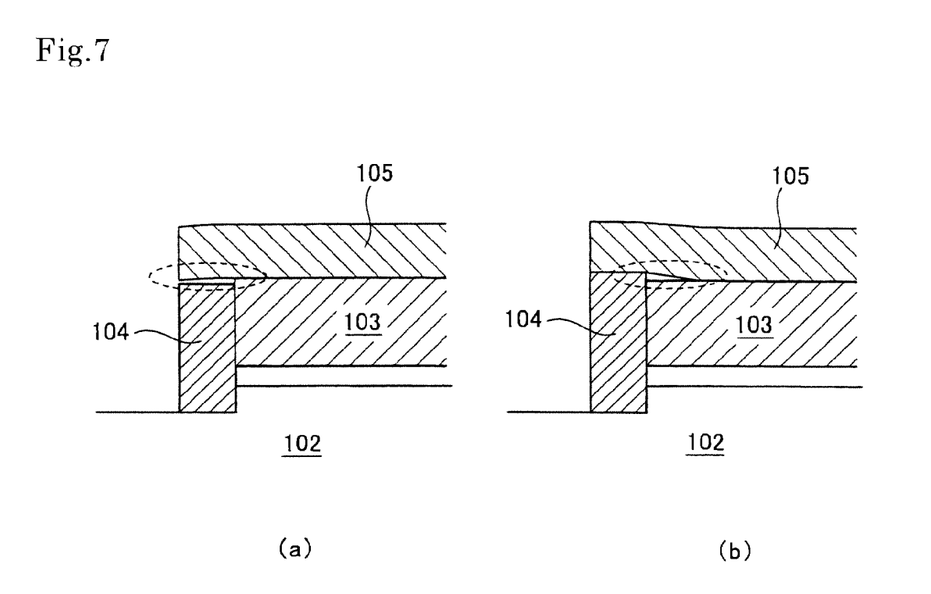
FIG. 7(a) shows a part of a conventional rotor structure element at a low temperature.
FIG. 7(b) shows a part of the conventional rotor structure element at a high temperature.

At a low temperature (for example, lower than 0° C.), as shown in a broken-lined ellipse in FIG. 7(a), a fastening force applied by the reinforce ring 105 with respect to the side plate 104 becomes weak so that rotational torque of the permanent magnet 103 is not certainly transmitted to the rotor shaft 102. At a high temperature (for example, equal or higher than 150° C.), as shown in a broken-lines ellipse in FIG. 7(b), the fastening force applied by the reinforce ring 105 with respect to the permanent board 104 becomes weak so that tensile stress of the permanent magnet 103 caused by centrifugal force is not certainly controlled. The permanent magnet 103 might be broken.

As described above, a purpose of the present invention is to provide a rotor structure of a permanent magnet type rotary machine, wherein an interference for a reinforce element for stabling a permanent magnet rotated at high speed is manufactured by an usual method with a good productive efficiency and a rotational torque transmitting performance is superior while the rotational structure is rotated at high speed at a temperature of which a range is wide.

Means to Solve the Subject

To resolve the above subjects, in a rotor structure of a permanent magnet type rotary machine according to the first invention, a permanent magnet formed cylindrically is fixed at an circumferential section of a rotor shaft and torque acting on the permanent magnet is transmitted to the rotor shaft, the rotor structure of the permanent magnet type rotary machine is characterized of comprising a pair of two side plates formed annularly and having an axial hole into which the rotor shaft is fitted so as to move them integrally, and each side plate arranged on the respective end surface of the permanent magnet and the side plates confronting with each other and each side plate having an annular groove coaxially with the axial hole and a holding member formed cylindrically, for covering an outer peripheral surface of the permanent magnet and an outer peripheral surface of each the side plate, fastening the permanent magnet and the side plates so as to move then integrally and transmitting torque acting on the permanent magnet to the rotary shaft through the side plates fastening the permanent magnet and the side plates so as to move them integrally, wherein an outside portion of each side plate with respect to the annular groove along the radial direction is elastically deformed so as to shrink a diameter of the side plate along the radial direction by providing the annular groove in the case that a thermal expansion coefficient of each the side plate is larger than that of the permanent magnet and then an outer diameter of each the side plate becomes larger than that of permanent magnet.

In a rotor structure of a permanent magnet type rotary machine according to the second invention, each the side plate has the other annular groove on another end surface opposite to the end surface on which the annular groove is formed and the other groove is coaxial with the axial hole in the first invention wherein the second invention is characterized of a diameter of the other annular groove being different from that of the annular groove.

In a rotor structure of a permanent magnet type rotary machine according to the third invention, the third invention is characterized in that an outer diameter of each the side plate is equal to an outer diameter of the permanent magnet at a low temperature in the first invention or the second invention.

Effect of the Invention

In accordance with a rotor structure of a permanent magnet type rotary machine according to the first invention, a permanent magnet formed cylindrically is fixed at an circumferential section of a rotor shaft and torque acting on the permanent magnet is transmitted to the rotor shaft, the rotor structure of the permanent magnet type rotary machine is characterized of comprising a pair of two side plates formed annularly and having an axial hole into which the rotor shaft is fitted so as to move them integrally, and each side plate arranged on the respective end surface of the permanent magnet and the side plates confronting with each other and each side plate having an annular groove coaxially with the axial hole and a holding member formed cylindrically, for covering an outer peripheral surface of the permanent magnet and an outer peripheral surface of each the side plate, fastening the permanent magnet and the side plates so as to move them integrally and transmitting torque acting on the permanent magnet to the rotary shaft through the side plates. While a temperature of the permanent magnet and a temperature of the side plates are increased by operation the permanent magnet type rotary machine, even if an outer diameter of the respective side plate is larger than the of the permanent magnet caused by the difference of thermal expansion coefficient between the permanent magnet and the side plates, an outside portion of the side plate with respect to the annular groove along a radial direction is elastically deformed toward the radial direction by providing the annular groove on an end surface of the respective side plate confronting with the permanent magnet and a size difference between the permanent magnet and the side plates can be adjusted so that an interference of the holding member with respect to the permanent magnet can be maintained. Thus, in a temperature of which a range is wide, torque acting on the permanent magnet is certainly transmitted to the rotary shaft and it is possible to prevent the magnet from being broken by centrifugal force.

That is, in accordance with the present invention, even if the rotary machine is rotated at high speed in a temperature of which a range is wide, the holding member is also used as a reinforce member having an interference in which a permanent magnet can be rotated at high speed. The rotary machine according to the present invention can be manufactured in an actual industrial use so that it is possible to provide a rotary structure of a permanent magnet type rotary machine in which rotational torque is superiorly transmitted.

In a rotor structure of a permanent magnet type rotary machine according to the second invention as described above, each the side plate has the other annular groove on another end surface opposite to the end surface on which the annular groove is formed and the other groove is coaxial with the axial hole wherein a diameter of the other annular groove is different from that of the annular groove. In addition to an effect obtained by the first invention, an interference of the holding member with respect to the permanent magnet is more certainly maintained.

In a rotor structure of a permanent magnet type rotary machine according to the third invention as described above, an outer diameter of each the side plate is equal to an outer diameter of the permanent magnet at a low temperature. At the low temperature, an outer peripheral portion of the permanent magnet and an outer peripheral portion of side plates are integrally fastened by the holding member. At a high temperature, even if the outer diameter of the side plate is larger than that of the permanent magnet caused by a difference of thermal expansion coefficient between them, the respective side plates is deformed so as to shrink its diameter along the radial direction. It is prevented the outer diameter of the respective side plates confronting with the permanent magnet from being larger than the outer diameter of the permanent magnet so that the interference of the holding member with respect to the permanent magnet can be maintained. The tensile stress acting on the permanent magnet caused by the centrifugal force can be controlled so as to prevent the permanent magnet from being broken.

BRIEF DESCRIPTION OF THE DRAWINGS

[FIG. 1]

[FIG. 2]

[FIG. 3]

[FIG. 4]

[FIG. 5]

[FIG. 6]

[FIG. 7]

EMBODIMENT OF THE INVENTION

The present invention will be descried with reference to the following description concerning with embodiments according to the present invention.

Embodiment 1

Figure 1:
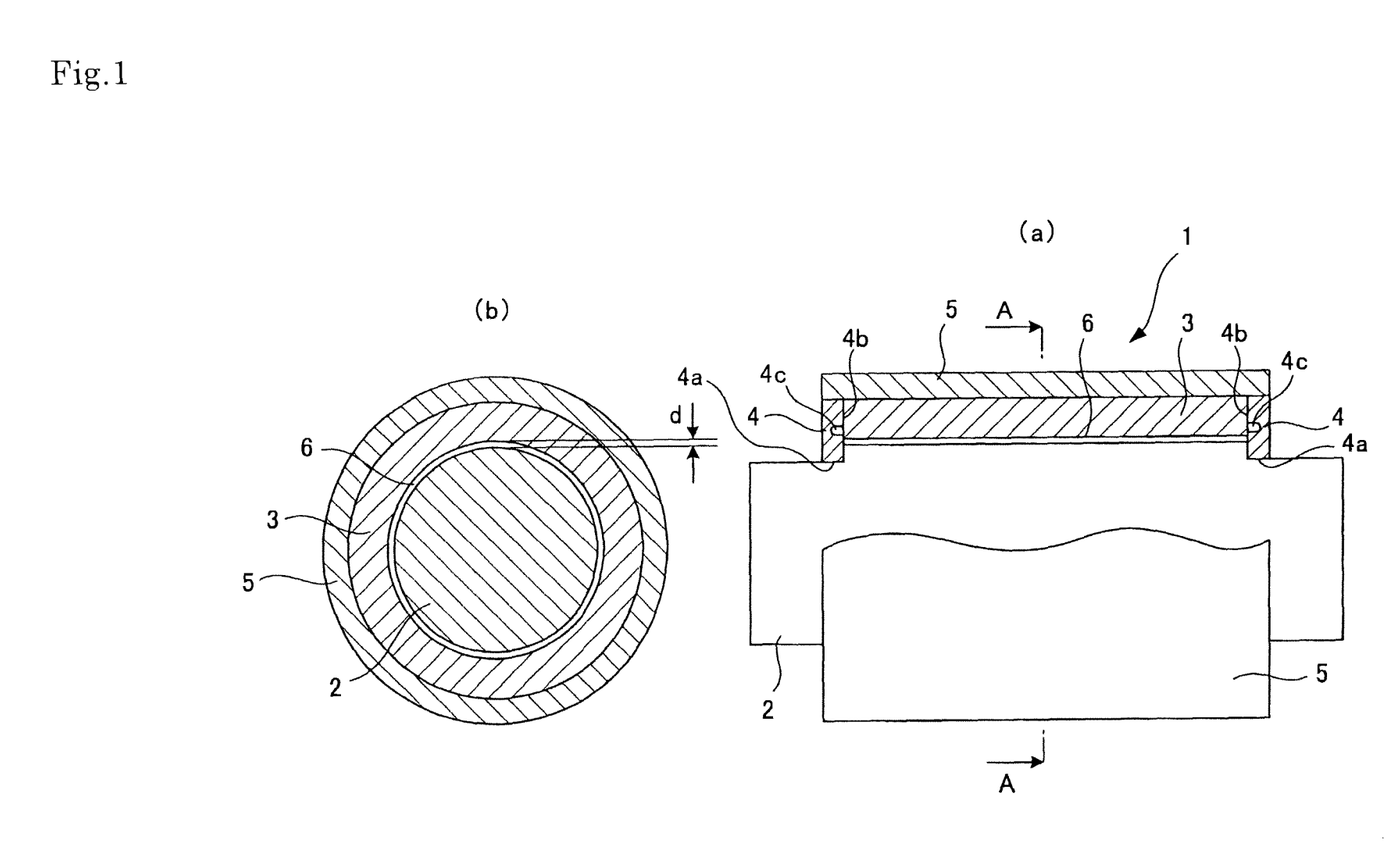
FIG. 1(a) is a cross sectional view for showing a rotor structure of a permanent magnet type rotary machine of the first embodiment according to the present invention.
FIG. 1(b) is a cross sectional view taken a line A-A in FIG. 1(a).
Figure 2:
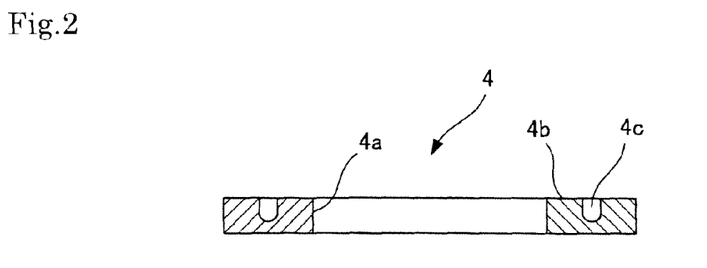
FIG. 2 is a cross sectional view for showing one of side plates of the first embodiment of the present invention.
Figure 3:
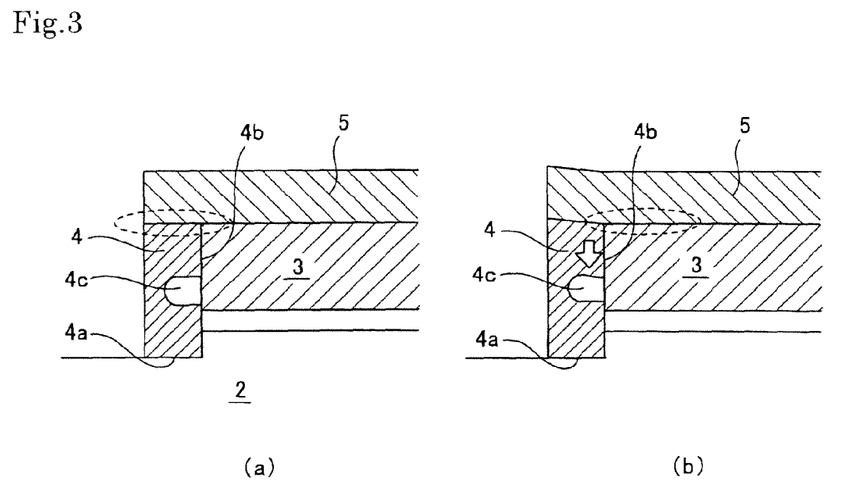
FIG. 3(a) is a cross sectional view for showing a condition of a side plate of the first embodiment according to the present invention at a low temperature.
FIG. 3(b) is a cross sectional view for showing a condition of a side plate of the first embodiment according to the present invention at a high temperature.

The first embodiment according to the present invention will be described with reference to FIG. 1 to FIG. 4. FIG. 1(a) is a cross sectional view for showing a rotor structure of a permanent magnet type rotary machine of the first embodiment according to the present invention. FIG. 1(b) is a cross sectional view taken a line A-A in FIG. 1(a). FIG. 2 is a cross sectional view for showing a side plate of the first embodiment of the present invention. FIG. 3(a) is a cross sectional view for showing a condition of a side plate of the first embodiment according to the present invention at a low temperature. FIG. 3(b) is a cross sectional view for showing a condition of a side plate of the first embodiment according to the present invention at a high temperature. For example, the embodiment is applicable to a permanent magnet type synchronous high speed rotational electric motor or a permanent magnet type synchronous rotational electric motor.

As shown in FIG. 1 and FIG. 2, a rotor structure 1 comprises a rotor shaft 2, a permanent magnet formed cylindrically 3 provided on an outer peripheral surface of the rotor shaft 2, side plates 4 made of metal, each side plate 4 contacting with a respective end surface of the permanent magnet 3 and a holding ring 5 formed cylindrically provided on an outer peripheral surface of the permanent magnet 3 and an outer peripheral surface of the side plate 4 in order to reinforce the permanent magnet 3.

The each side plate 4 is an annular shape having an axial hole 4a at an axial portion of the side plate 4. The rotor shaft 2 is inserted into and fixed at the axial hole 4a by the press-in method or the shrinkage fitting method so that the side plates 4 are integrally formed with the rotor shaft 2. At a low temperature, the side plates 4 are designed to have their outer diameter almost equal to an outer diameter of the permanent magnet 3.

Further, on a side surface 4b of each side plate 4 confronting with the permanent magnet 3, an annular U-shaped groove (hereinafter, it is referred as "U-shaped groove") 4c of which is coaxial with the axial hole 4a is provided. In the embodiment, the U-shaped groove 4c is arranged at an intermediate portion between an inner diameter of the side plate 4 and an outer diameter of the side plate 4. The bottom portion of the U-shaped groove is U-shape in view of a cross sectional view. A width of the U-shaped groove 4c along a radial direction is properly designed in accordance with a size of the side plate 4.

A holding ring 5 integrally fastens the permanent magnet 3 and the side plates 4 by pressing in and shrinkage fitting the holding ring 5 with the permanent magnet 3 and the side plates 4 simultaneously. In the other words, the holding ring 5 is a member for holding the permanent magnet 3 and the side plates 4 integrally so that torque force acting on the permanent magnet 3 is transmitted to the rotor shaft 2 through the side plates 4.

Interference 6 having a distance d is provided between the rotor shaft 2 and the permanent magnet 3 so that the permanent magnet 3 is not contacted with the rotor shaft 2.

Hereinafter, an operation and an effect of the embodiment will be described. In accordance with a rotor structure of a permanent magnet type rotary machine according to the embodiment of the present invention as described above, an outer diameter of the permanent magnet 3 is designed to be equivalent with an outer diameter of each the side plate 4 at a low temperature. At a low temperature as shown in a broken lined ellipse in FIG. 3a, an outer peripheral surface of the permanent magnet 3 and that of the side plate is fastened by the holding ring 5, respectively so as to move them integrally.

At a high temperature as shown in a broken lined ellipse in FIG. 3b, the outer diameter of the permanent magnet 3 is larger than each the outer diameter of the side plate 4 due to differences of thermal expansion coefficient between the permanent magnet 3 and the side plates, each the side plate 4 is elastically deformed so as to shrink an outer side of each the side plate 4 along a radial direction by the U-shaped groove 4c provided at the respective side plate 4 confronting with the permanent magnet 3. Thereby, as shown in the broken lined ellipse, the outer diameter of each the side plate 4 confronting with the permanent magnet 3 is restricted to become longer comparing with the outer diameter of the permanent magnet 3 so that interference is maintained with respect to the permanent magnet 3 of the holding ring 5. Thus, even if the rotor structure is at a high temperature, tensile stress of the permanent magnet 3 caused by the centrifugal force is controlled so that the permanent magnet 3 is prevented from being damaged.

As described above, in accordance with the rotor structure of the permanent magnet type rotary machine according to the embodiment according to the present invention, a performance of the permanent magnet type rotary machine can be maintained in a wide temperature range. While a manufacturing efficiency is improved by a practical manufacturing method, interference with respect to the holding ring 5 is durable even if the permanent magnet 3 is rotated at high speed. It is possible to provide a superior rotor structure of a permanent type rotor structure capable of transmitting rotational torque.

In the above embodiment, a U-shaped groove 4c is substantially arranged at an intermediate position between an inner diameter of one side plate 4 and an outer diameter of the side plate 4. However, an arrangement of the U-shaped groove may be arranged at the other positions. It is considerable that a notch having a desirable sized C-shaped surface at a surface of the side plate 4 confronting with a holding ring 5 and a corner portion of a permanent magnet 3 so as to make a gap between the permanent magnet and the respective side plate 4 at a position confronting with an inner surface of the holding ring 5. In such a structure, a contacting area of the holding ring 5 and the side plates 4 for transmitting torque of the permanent magnet is reduced and a force of the holding ring 5 for holding the side plates 4 is afraid of being weakened. Therefore, it is preferable that a U-shaped groove is arranged at a position between the outer peripheral surface of one side plate 4 and the inner peripheral surface of the side plate 4 with a certain interval.

Embodiment 2

Figure 4:
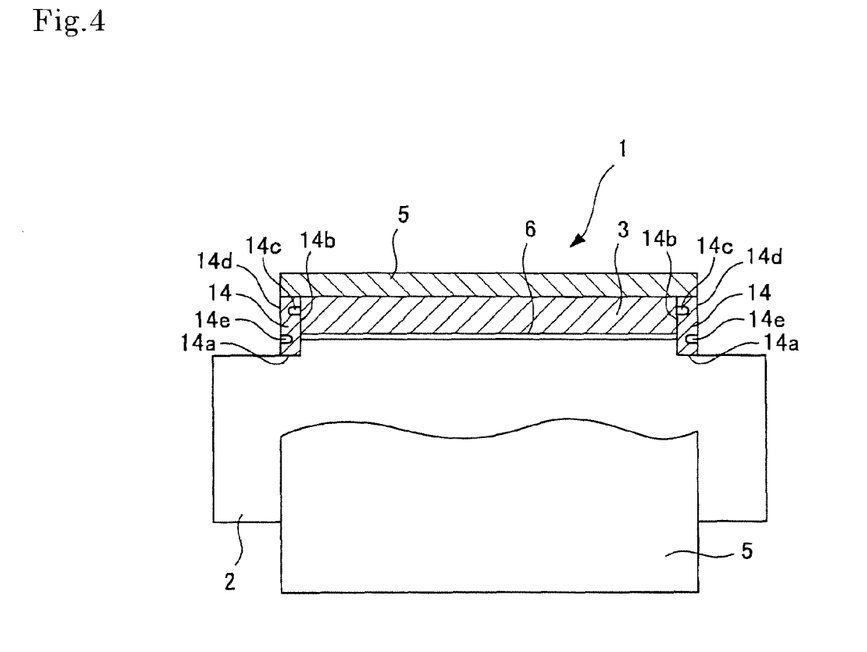
FIG. 4 is a partial cross sectional view for showing a rotor structure of a permanent magnet type rotary machine of the second embodiment according to the present invention.
Figure 5:
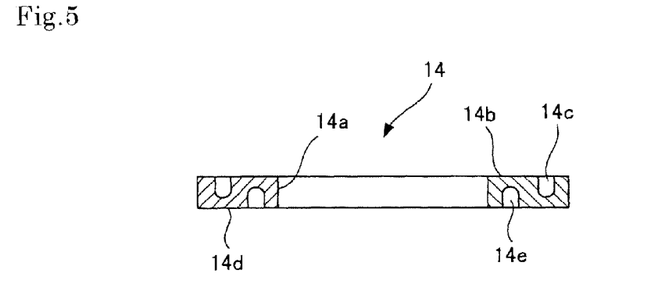
FIG. 5 is a cross sectional view for showing a side plate of the second embodiment according to the present invention.
Figure 6:
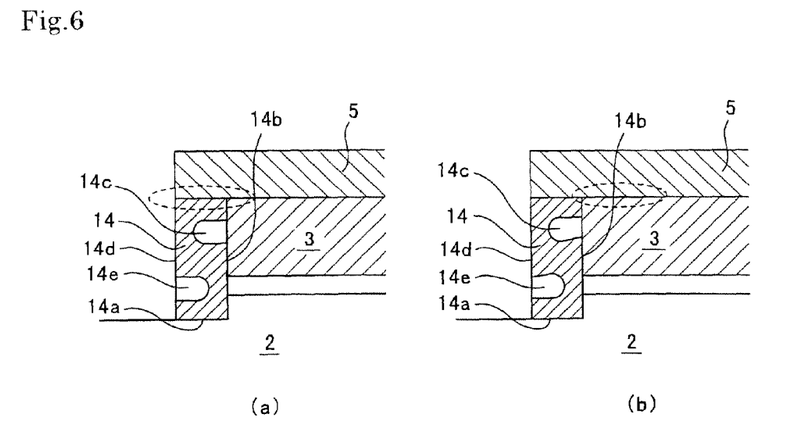
FIG. 6(a) is a cross sectional view for showing a condition of the side plate of the second embodiment according to the present invention at a low temperature.
FIG. 6(b) is a cross sectional view for showing a condition of the side plate of the second embodiment according to the present invention at a high temperature.

The second embodiment according to the present invention will be described with reference to FIG. 4 to FIG. 6. FIG. 4 is a partial cross sectional view for showing a rotor structure of a permanent magnet type rotary machine of the second embodiment according to the present invention. FIG. 5 is a cross sectional view for showing one of side plates of the second embodiment according to the present invention. FIG. 6(a) is a cross sectional view for showing a condition of the side plates of the second embodiment according to the present invention at a low temperature. FIG. 6(b) is a cross sectional view for showing a condition of the side plates of the second embodiment according to the present invention at a high temperature. The second embodiment shows a plurality of U-shaped grooves on each the side plate 14 in stead of the side plate 4 of the first embodiment as described above and shown in FIG. 1 and FIG. 3.

As shown in FIG. 4 and FIG. 5, one of the side plates 14 according to the second embodiment is arranged so as to contact with the both end surfaces of a permanent magnet 3 and has an axial hole 14a at a center portion thereof. A rotor shaft 2 is fixed in the axial hole 14a by a press-in method or a shrinkage fit method so that the side plate 14 and the rotor shaft 2 can be moved integrally. At a tow temperature, an outer diameter of the side plate 14 is designed to be equivalent of an outer diameter of a permanent magnet 3.

Further, on the both side surfaces 14b and 14d of the side plate 14, an annular U-shaped groove (hereinafter, it is referred as "U-shaped groove") 14c and the other annular U-shaped groove 14e is coaxially formed with respect to the axial hole 14a, respectively. Herein, a width of the U-shaped grooves 14c and 14e along a radial direction is suitably designed depending on a size of the side plate 4.

A diameter of the U-shaped groove 14c and that of the U-shaped groove 14e are different each other (in FIG. 4, the diameter of the U-shaped groove 14e is smaller than that of the U-shaped groove 14c). On the other words, the both U-shaped grooves are formed at different positions with respect to a radial direction and each bottom portion has a U-shaped cross-sectional view.

Regarding the other elements in the second embodiment, the structure thereof is substantially equal to the structure of the first embodiment. Therefore, each element corresponding to the element described in the first elements has the same reference numeral.

Hereinafter, an operation and an effect of the second embodiment will be described. In the rotor structure of the permanent magnet type rotary machine according to the embodiment, U-shaped grooves 14c and 14e is formed on the both side surface 14b, 14d of the side plate 14, respectively. Upon comparing with the second embodiment and the first embodiment, a width of the side plate 14 with respect to a radial direction can be totally varied.

For example, as shown in FIG. 6(a), the outer peripheral surface of the permanent magnet 3 and that of the side plate 4 are fastened by the holding ring 5 so as to move them integrally at a low temperature. As shown in FIG. 6(b), at a high temperature, the outer diameter of the side plate 14 is larger than that of the permanent magnet 3 due to the differences between thermal expansion coefficients thereof. However, the side plate 14 is elastically deformed so as to shrink the whole of the side plate 14 with respect to the radial direction by the U-shaped grooves 14c and 14e provided at the side plate 14.

As described above, in the second embodiment, a tolerance between the outer diameter of the permanent magnet 3 and the outer diameter of the side plate 14 is prevented from being occurred so that a phenomenon that rotational torque acting on the permanent magnet 3 is transmitted to the rotor shaft 2 improperly in the case that the outer diameter of each the side plate 14 is smaller than the outer diameter of the permanent magnet 3 and a phenomenon that tensile stress of the permanent magnet 3 caused by centrifugal force is controlled improperly are prevented from being occurred. Thus, even if the rotor shaft 2 is rotated at high speed in a temperature of which a range is wide, interference of the holding ring 6 is durable against the permanent magnet 3 rotated at high speed and the rotational torque acting on the permanent magnet 3 is certainly transmitted to the rotor shaft 2.

In the second embodiment, each one U-shaped groove 14c (14e) is provided at the end surfaces 14b (14d) of each the side plate, respectively. However, the other arrangements might be acceptable. For example, a plurality of U-shaped grooves having the different diameter can be provided at the both end surfaces 14b and 14d, respectively in accordance with a size of the side plate 14. The other arrangements are also acceptable, if one arrangement is within an essence of the present invention.

INDUSTRIAL UTILITY

The present invention is applicable to a rotor structure of a permanent magnet type high speed rotary machine. In particularly, the present invention is suitable for a permanent magnet type rotary machine wherein a cylindrical hollow permanent magnet is arranged around an circumferential section of a rotor shaft, annular side plates are made of metal and each the annular side plate is arranged fixed at the both end of the permanent magnet by a press-in method or a shrinkage fitting method so as to move together with the permanent magnet and a holding ring formed cylindrically and made of non-magnetic high strength material is attached to the rotor shaft by a press-in method or a shrinkage method so as to transmit torque acting on the permanent magnet to the rotor shaft stably even if the permanent magnet and the rotor shaft are not contacted each other.

EXPLANATION OF NUMERAL REFERENCE

1 . . . rotor structure
2 . . . rotor shaft
3 . . . permanent magnet
4, 14 . . . side plate
4a, 14a . . . axial hole
4b, 14b, 14d . . . end surface
4c, 14c, 14e . . . U-shaped groove
5 . . . holding ring
6 . . . interference

The invention claimed is:
1. A rotor structure of a permanent magnet type rotary machine wherein a permanent magnet formed cylindrically is fixed at an circumferential section of a rotor shaft and torque acting on said permanent magnet is transmitted to said rotor shaft, said rotor structure of said permanent magnet type rotary machine characterized of comprising:
a pair of two side plates formed annularly and having an axial hole into which said rotor shaft is fitted so as to move them integrally, and each side plate arranged on the respective end surface of said permanent magnet and said side plates confronting with each other and each side plate having an annular groove coaxially with said axial hole and
a holding member formed cylindrically, for covering an outer peripheral surface of said permanent magnet and an outer peripheral surface of each said side plate, fastening said permanent magnet and said side plates so as to move then integrally and transmitting torque acting on said permanent magnet to said rotary shaft through said side plates fastening said permanent magnet and said side plates so as to move them integrally,
wherein an outside portion of each said side plate with respect to the annular groove along the radial direction is elastically deformed so as to shrink a diameter of the side plate along the radial direction by providing the annular groove in the case that a thermal expansion coefficient of each the side plate is larger than that of the permanent magnet and then an outer diameter of each the side plate becomes larger than that of permanent magnet; and
wherein each said side plate has another annular groove on another end surface opposite to said end surface on which said annular groove is formed and said other groove is coaxial with said axial hole wherein a diameter of said other annular groove is different from that of said annular groove.
2. A rotor structure of a permanent magnet type rotary machine as claimed in claim 1 characterized in that an outer diameter of each said side plate is equal to an outer diameter of said permanent magnet at a low temperature.

* * * * *